United States Patent
Raja et al.

(10) Patent No.: US 11,351,860 B2
(45) Date of Patent: Jun. 7, 2022

(54) OPERATING DEVICE FOR ELECTRIC VEHICLE

(71) Applicant: SUZUKI MOTOR CORPORATION, Hamamatsu (JP)

(72) Inventors: Gopinath Raja, Hamamatsu (JP); Masayoshi Wada, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 116 days.

(21) Appl. No.: 16/837,700

(22) Filed: Apr. 1, 2020

(65) Prior Publication Data
US 2020/0317049 A1    Oct. 8, 2020

(30) Foreign Application Priority Data

Apr. 5, 2019   (JP) ............................ JP2019-072890

(51) Int. Cl.
*B60K 26/02*   (2006.01)
*B60L 15/20*   (2006.01)
(Continued)

(52) U.S. Cl.
CPC .............. *B60K 26/02* (2013.01); *B60K 1/02* (2013.01); *B60L 15/2009* (2013.01); *B62D 1/12* (2013.01);
(Continued)

(58) Field of Classification Search
CPC . B60K 1/02; B60K 2026/029; B60L 2200/24; B62D 1/12
(Continued)

(56) References Cited

U.S. PATENT DOCUMENTS

| 3,966,220 A | 6/1976 | Forsyth et al. |
| 4,128,258 A | 12/1978 | Johnson |

(Continued)

FOREIGN PATENT DOCUMENTS

| CN | 207966826 U | 10/2018 |
| JP | H 09-117476 | 5/1997 |

(Continued)

OTHER PUBLICATIONS

Office Action dated May 21, 2021 issued in U.S. Appl. No. 16/593,052.
(Continued)

*Primary Examiner* — Tony H Winner
(74) *Attorney, Agent, or Firm* — Cozen O'Connor

(57) ABSTRACT

An operating device of an electric vehicle enables an electric vehicle to be operated, the electric vehicle having: left and right driving wheels; and left and right driving motors respectively independently driving these left and right driving wheels. The operating device has: a joystick operable to move so as to issue a turning direction instruction of the vehicle; and a traveling instruction portion issuing a traveling instruction of the vehicle by operation different from movement operation of this joystick. The joystick has a grip operable to be gripped by an occupant of the vehicle. By making a difference between rotating speeds of the left and right driving motors based on a combination of the turning direction instruction of the joystick and the traveling instruction of the traveling instruction portion, a gentle turn or a pivotal brake turn of the vehicle is performed.

8 Claims, 4 Drawing Sheets

(51) Int. Cl.
  *B60K 1/02* (2006.01)
  *B62D 11/04* (2006.01)
  *B62D 1/12* (2006.01)

(52) U.S. Cl.
  CPC ........ *B62D 11/04* (2013.01); *B60K 2026/029* (2013.01); *B60L 2200/24* (2013.01)

(58) Field of Classification Search
  USPC .............................. 180/65.1, 6.32, 6.48, 333
  See application file for complete search history.

(56) References Cited

U.S. PATENT DOCUMENTS

| | | | |
|---|---|---|---|
| 4,613,151 A | 9/1986 | Kielczewski | |
| 5,782,483 A | 7/1998 | Rogers et al. | |
| 6,530,445 B1 | 3/2003 | Flowers et al. | |
| 7,293,625 B2* | 11/2007 | Kumazawa | B66C 13/56 180/333 |
| 8,894,346 B2* | 11/2014 | Lewis | E02F 3/3414 414/685 |
| 9,725,114 B1 | 8/2017 | Brown et al. | |
| 9,889,874 B1* | 2/2018 | Clause | G05G 9/047 |
| 2003/0098196 A1* | 5/2003 | Yanaka | G05G 9/047 180/315 |
| 2004/0094999 A1 | 5/2004 | Volotsenko | |
| 2006/0137931 A1* | 6/2006 | Berg | B62D 1/22 180/333 |
| 2008/0223649 A1* | 9/2008 | Wandeler | A61G 5/048 180/333 |
| 2008/0277190 A1* | 11/2008 | McCord | E02F 9/2004 180/444 |
| 2008/0290622 A1* | 11/2008 | Okada | B62D 7/026 280/99 |
| 2010/0084831 A1 | 4/2010 | Wang | |
| 2011/0087416 A1* | 4/2011 | Patmore | B60L 50/20 701/93 |
| 2011/0088961 A1* | 4/2011 | Case | E02F 9/2004 180/333 |
| 2014/0083225 A1* | 3/2014 | Downs | B60K 35/00 74/471 XY |
| 2019/0359246 A1 | 11/2019 | Lee | |

FOREIGN PATENT DOCUMENTS

| | | |
|---|---|---|
| JP | H 10-248879 | 9/1998 |
| JP | 2000-005239 | 1/2000 |
| JP | 2001-048497 | 2/2001 |
| JP | 2005-328914 | 12/2005 |
| JP | 2006-103512 | 4/2006 |
| JP | 2009-183407 | 8/2009 |
| JP | 2016-168153 | 9/2016 |

OTHER PUBLICATIONS

URL: https://www.suzuki.co.jp/release/c/2018/1102/, Nov. 2, 2018, Publisher: Suzuki Motor Corporation.
Written Opinion with Search Report dated Feb. 4, 2022 issued in French Patent Application No. 2003260.

\* cited by examiner

OPERATING DEVICE FOR ELECTRIC VEHICLE

FIELD OF THE INVENTION

The present invention relates to an operating device for an electric vehicle, which can operate the electric vehicle capable of traveling by driving of driving wheels by using driving motors.

DISCUSSION OF THE RELATED ART

As a moving means for users, such as the elderly, persons needing care, or the like, electric vehicles, such as electric wheelchairs, electric carts, or the like, which can travel by driving means such as motors, are widely used. Such an electric vehicle is also called a "senior car". Typically, the electric vehicle includes a moving base which is configured so as to be travelable by electric driving, and a seat which has a seating part and is located above the moving base.

Furthermore, the electric vehicle includes an operating device which is configured so as to allow an occupant seated on the seating part of the seat to operate the electric vehicle. The operating device is required so as to enhance operability thereof, and a variety of operating devices of the electric vehicles have been proposed to enhance operability.

In an example of the above operating device of the electric vehicle, to be presented, a drive controlling device for operating an electric vehicle including a vehicle main body having: right and left driving rear wheels; front wheels located in front of the right and left driving rear wheels; and right and left driving motors which respectively independently drive the right and left driving rear wheels. Specifically, this drive controlling device includes a joystick which is movable in a lying-down manner in radial directions so as to allow angles of traveling directions and traveling speeds of the vehicle main body to be input together. Based on instructions of the angles of traveling directions and instructions of the traveling speeds, which are simultaneously input by lying-down movements of the joystick, the right and left driving motors are respectively independently driven, thereby performing drive controlling of the electric vehicle (for example, see JP 2000-005239 A).

However, in the above example of the operating device of the electric vehicle, the joystick easily lies down frontward or rearward against the intention of the occupant thereon. Therefore, the occupant touches the joystick contrary to the intention thereof, and as a result, it is likely that the joystick is erroneously operated such that the joystick lies down frontward or rearward. Due to the above erroneous operation, it is likely that the electric vehicle travels forward or backward contrary to the intention of the occupant. In addition, when the occupant issues a turning instruction of the electric vehicle, it is likely that the joystick is erroneously operated such that the joystick lies down frontward or rearward by a frontward or rearward lying-down amount which the occupant does not intend, and this erroneous operation is likely to cause the electric vehicle to travel at a speed contrary to the intention of the occupant.

Accordingly, it is desirable to configure the operating device of the electric vehicle so as to be capable of preventing erroneous operation by the occupant, and capable of enhancing operability thereof.

SUMMARY OF THE INVENTION

To solve the above problems, an operating device of an electric vehicle according to an aspect is configured so as to enable the electric vehicle to be operated, the electric vehicle having: left and right driving wheels being located respectively on a left side and a right side of the electric vehicle facing in an advancing direction; and left and right driving motors respectively independently driving the left and right driving wheels, the operating device includes: a joystick being configured to be operable to move so as to issue a turning direction instruction of the electric vehicle; and a traveling instruction portion being configured so as to issue a traveling instruction of the electric vehicle by operation being different from movement operation of the joystick, the joystick has a grip being configured so as to be operable to be gripped by an occupant on the electric vehicle, and by making a difference between rotating speeds of the left and right driving motors based on a combination of the turning direction instruction of the joystick and the traveling instruction of the traveling instruction portion, a gentle turn of the electric vehicle or a pivotal brake turn of the electric vehicle is performed.

In an operating device of an electric vehicle according to an aspect, erroneous operation made by an occupant can be prevented, and operability thereof can be enhanced.

DETAILED DESCRIPTION OF THE DRAWINGS

An operating device of an electric vehicle according to an Embodiment will be described below. The electric vehicle operated by the operating device may be a single-seater. Furthermore, the electric vehicle may be configured such that a seat installed thereon is opened to the outside of the mobile object. For example, the electric vehicle may be an electric wheelchair, an electric cart, and/or the like. In particular, the electric vehicle can be a single-seater electric wheelchair, a single-seater electric cart, and/or the like. However, the electric vehicle is not limited to these configurations. Hereinafter, the electric vehicle is simply called a "vehicle", if necessary.

Figure 1:
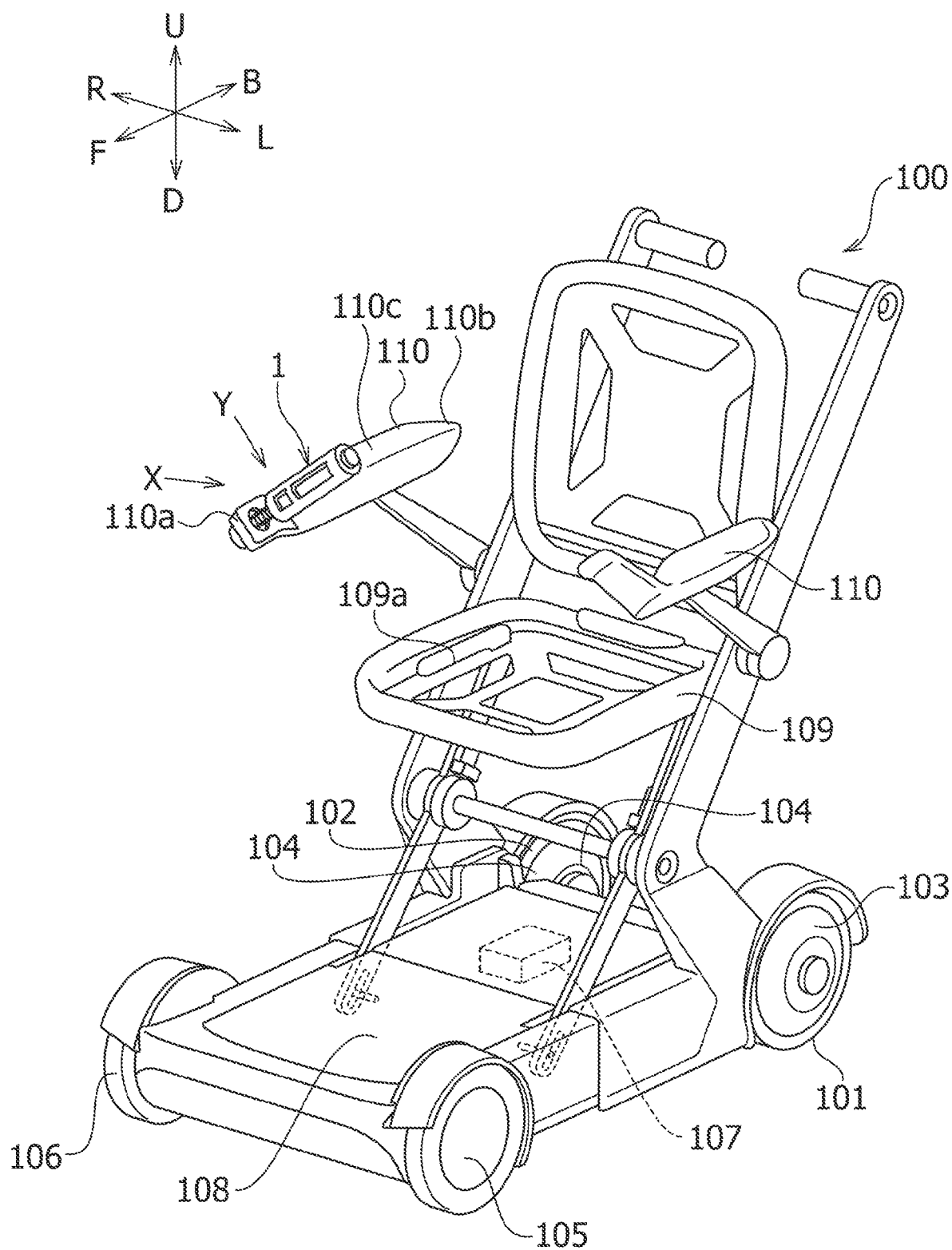
FIG. 1 is a perspective view schematically showing an electric vehicle having an operating device according to an Embodiment.
Figure 2:
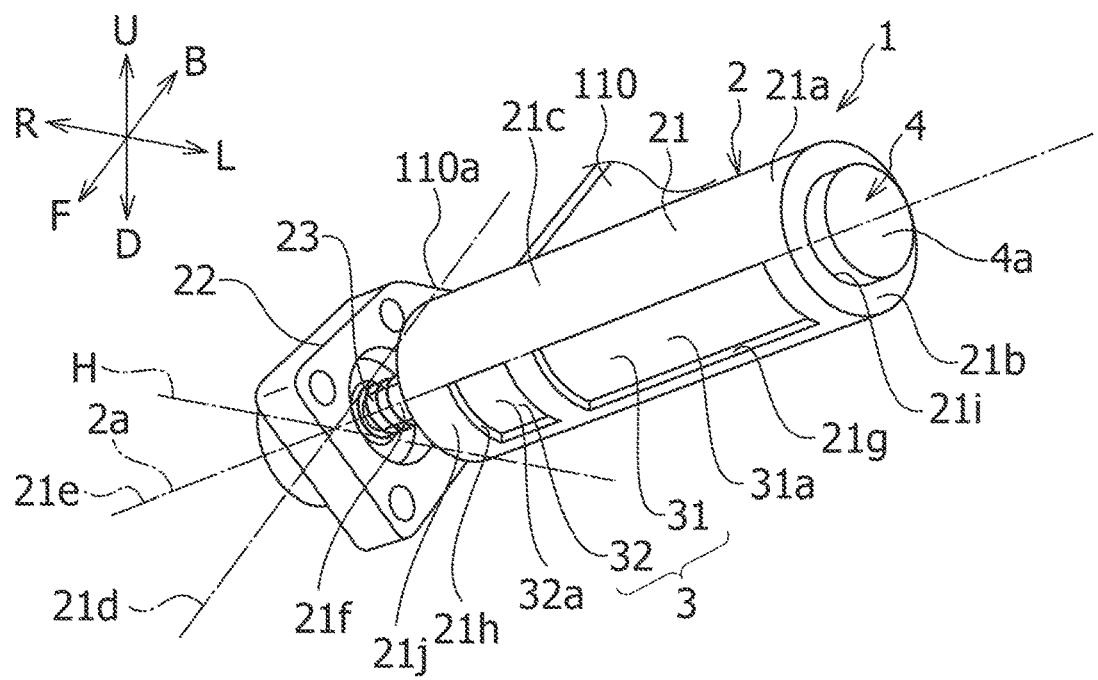
FIG. 2 is a perspective view schematically showing the operating device according to the Embodiment and a peripheral portion thereof, viewed from an arrow X in FIG. 1.
Figure 3:
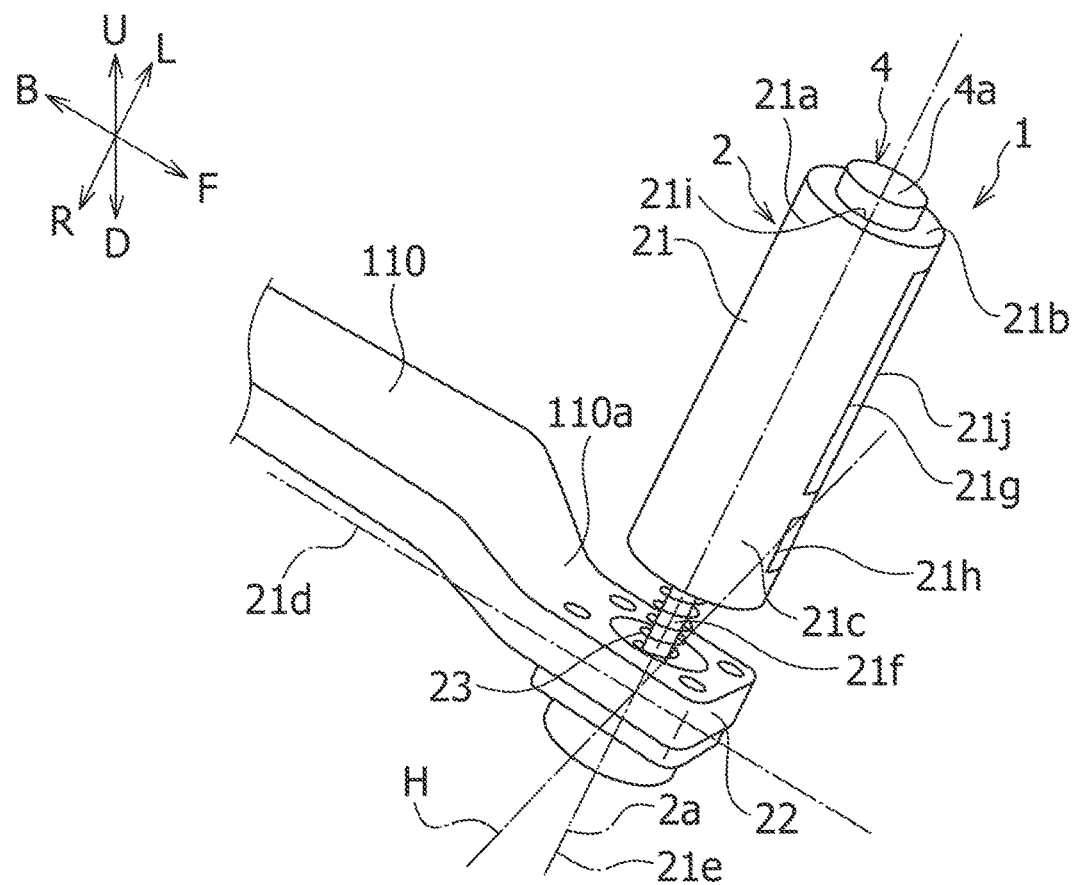
FIG. 3 is a perspective view schematically showing the operating device according to the Embodiment and the peripheral portion thereof, viewed from an arrow Y in FIG. 1.

Note that in the drawings used for the description of the Embodiment, directions with the vehicle as reference are shown as follows. In FIGS. 1 to 3, a vehicle front and a vehicle rear are indicated by an arrow F and an arrow B, respectively. Therefore, an advancing direction and a backing up direction of the vehicle are indicated by the arrow F and the arrow B, respectively. In addition, a vehicle front-rear direction is indicated by the arrow F and the arrow B.

In FIGS. 1 to 6, a left side and a right side of the vehicle which faces in an advancing direction, are indicated by an arrow L and an arrow R, respectively. Note that the left side and the right side of the vehicle which faces in the advancing direction, are defined as a vehicle left side and a vehicle right side, respectively. A vehicle width direction is indicated by the arrow L and the arrow R. Furthermore, in FIGS. 1 to 6, a vehicle upper and a vehicle lower are indicated by an arrow U and an arrow D, respectively. A vehicle upper-lower direction is indicated by the arrow U and the arrow D.

Outlines of Operating Device and Electric Vehicle

With reference to FIGS. 1 to 7, outlines of an operating device 1 according to the Embodiment and an electric vehicle 100 operated by this operating device 1 will be described. First, as shown in FIG. 1, the vehicle 100 has a left driving wheel 101 and a right driving wheel 102 which are located respectively on the left side and the right side of the vehicle 100 facing in the advancing direction. Each of the left driving wheel 101 and the right driving wheel 102 is a traveling wheel of the vehicle 100.

The vehicle 100 also has a left driving motor 103 and a right driving motor 104 which respectively independently drive the left driving wheel 101 and the right driving wheel 102. This vehicle 100 is configured so as to be operable to perform a gentle turn and a pivotal brake turn. However, the vehicle may be configured so as to be operable to perform only one of the gentle turn and the pivotal brake turn.

Next, as shown in FIG. 1, the operating device 1 is installed on the vehicle 100. As shown in FIGS. 1 to 7, the operating device 1 has a joystick 2 which is configured to be operable to move so as to issue a turning direction instruction of the vehicle 100. The joystick 2 has a grip 21 which is configured so as to be operable to be gripped by an occupant on the vehicle 100. As shown in FIGS. 2 and 4 to 7, the operating device 1 has a traveling instruction portion 3 which is configured so as to issue a traveling instruction of the vehicle 100 by operation which is different from movement operation of the joystick 2. Each of the gentle turn and the pivotal brake turn of the vehicle 100 is performed by making a difference between rotating speeds of the left and right driving motors 103 and 104 so as to make a difference between rotating speeds of the left and right driving wheels 101 and 102 based on a combination of the turning direction instruction of the joystick 2 and the traveling instruction of the traveling instruction portion 3. For example, the gentle turn and the pivotal brake turn of the vehicle 100 can be switched in accordance with a traveling speed of the vehicle 100.

Furthermore, the outlines of the operating device 1 and the electric vehicle 100 may be as follows. As shown in FIGS. 2 and 4 to 7, the traveling instruction portion 3 has an advancing instruction part 31 which issues an advancing instruction of the vehicle 100, and a backing up instruction part 32 which issues a backing up instruction of the vehicle 100. Therefore, as the traveling instruction of the vehicle 100, the advancing and backing up instructions of the vehicle 100 are included. However, the traveling instruction portion can also have only the advancing instruction part. In this case, as the traveling instruction of the vehicle, only the advancing instruction of the vehicle is included.

Figure 7:
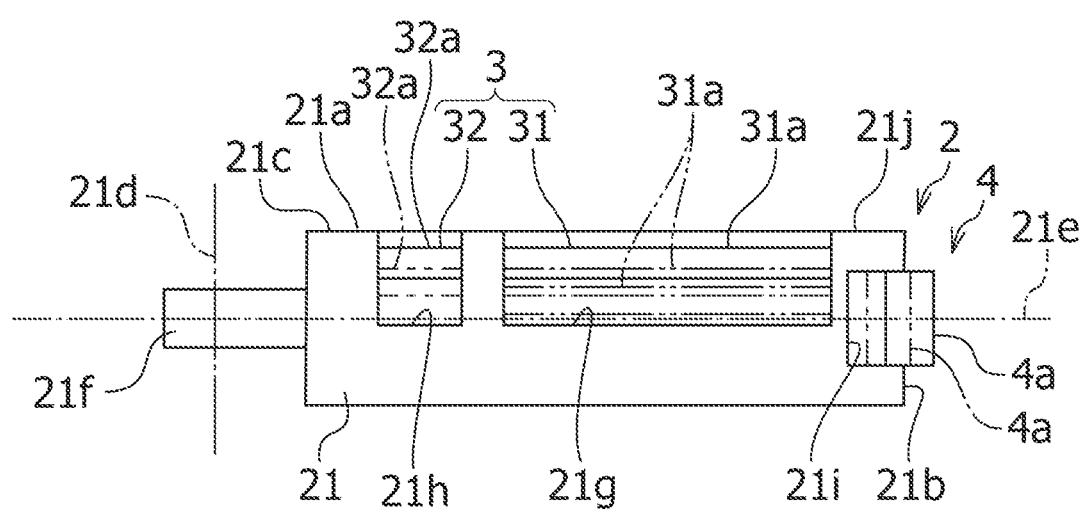
FIG. 7 is a cross-sectional view schematically showing the grip of the joystick of the operating device according to the Embodiment, in a state in which the grip is cut along line Z-Z in FIG. 4.

As shown in FIG. 7, the advancing instruction part 31 is configured so as to issue an advancing speed changing instruction of the vehicle 100 by changing an operating amount of this advancing instruction part 31. An advancing speed V of the vehicle 100 is changed by changing the rotating speeds of the left and right driving motors 103 and 104 so as to change the rotating speeds of the left and right driving wheels 101 and 102 based on the advancing speed changing instruction of the advancing instruction part 31.

As shown in FIGS. 2 and 4 to 7, the traveling instruction portion 3 are configured by using push switches 31 and 32. Specifically, the push switches 31 and 32 constitute the advancing and backing up instruction parts 31 and 32, respectively. The push switches 31 and 32 have push buttons 31a and 32a, respectively. This traveling instruction portion 3 is installed in the grip 21 of the joystick 2. Specifically, the advancing and backing up instruction parts 31 and 32 are installed in the grip 21. Furthermore, the push buttons 31a and 32a of the push switches 31 and 32 are located close to an interior of the grip 21 with respect to an outer surface 21a of the grip 21.

However, the part used for the traveling instruction portion is not limited to the push switch, and the advancing and backing up instruction parts are also not limited to the push switches. For example, the part used for the traveling instruction portion or at least one of the advancing and backing up instruction parts can also be a push switch, a toggle switch, a slide switch, a rotary switch, a rocker switch, and/or the like.

Furthermore, the operating device 1 has an auxiliary instruction portion 4 which is configured so as to issue an auxiliary instruction of the vehicle 100. In this operating device 1, when this auxiliary instruction is combined with an instruction other than the auxiliary instruction, option operation of the vehicle 100 is performed. The auxiliary instruction portion 4 is installed in the joystick 2. Furthermore, the auxiliary instruction portion 4 may be installed in a leading end part 21b of the grip 21 of the joystick 2. Furthermore, the auxiliary instruction portion 4 may be a push switch 4 having a push button 4a.

Specifically, as the instruction other than the auxiliary instruction, the advancing instruction of the advancing instruction part 31 is included. As the option operation of the vehicle 100, increasing the advancing speed V of the vehicle 100 is included. In this operating device 1, the advancing speed V of the vehicle 100 is increased by increasing the rotating speeds of the left and right driving motors 103 and 104 based on a combination of the advancing instruction of the advancing instruction part 31 and the auxiliary instruction of the auxiliary instruction portion 4.

In addition to the advancing instruction of the advancing instruction part 31, as the instruction other than the auxiliary instruction, the turning direction instruction of the joystick 2 is included. As the option operation of the vehicle 100, a spin turn of the vehicle 100 is included. In other words, the vehicle 100 is configured so as to be operable to perform the spin turn. In this operating device 1, the spin turn of the vehicle 100 is performed by mutually reversing the rotations of the left and right driving motors 103 and 104 based on a combination of the turning direction instruction of the joystick 2 and the auxiliary instruction of the auxiliary instruction portion 4. However, as the instruction other than the auxiliary instruction, only one of the advancing instruction of the advancing instruction part and the turning direction instruction of the joystick can also be included.

Details of Electric Vehicle

With reference to FIG. 1, the electric vehicle 100 may be as follows in detail. The left and right driving wheels 101 and 102 of the vehicle 100 constitute left and right rear driving wheels 101 and 102, respectively. Therefore, the left and right driving motors 103 and 104 can also be called left and right rear driving motors 103 and 104, respectively. The left and right rear driving wheels 101 and 102 are mutually independently driven and braked by using the left and right rear driving motors 103 and 104, respectively.

The vehicle 100 has a left driven wheel 105 and a right driven wheel 106 which roll in accordance with traveling of the vehicle 100 driven by the left driving wheel 101 and the right driving wheel 102, respectively. Each of the left and right driven wheels 105 and 106 is also a traveling wheel. The vehicle 100 has left and right braking mechanisms which are operable to brake the left and right driven wheels 105 and 106, respectively, although the left and right braking mechanisms are not particularly shown. The left and right driven wheels 105 and 106 constitute left and right front driven wheels 105 and 106 which are located in the vehicle front with respect to the left rear driving wheel 101 and the right rear driving wheel 102, respectively. Therefore, the left and right braking mechanisms can also be called left and right front braking mechanisms, respectively.

However, the configuration of the vehicle is not limited to the above configuration. For example, instead of the left and right driven front wheels, the vehicle can also have one driven front wheel which is located in a substantially central portion in the vehicle width direction. In addition, instead of the left and right front driven wheels, the vehicle can also have left and right front driving wheels and can also has left and right front driving motors which are operable to mutually independently drive and brake the left and right front driving wheels, respectively. In other words, the vehicle can have four driving wheels.

Instead of the left and right rear driving wheels, the vehicle can have left and right rear driven wheels and instead of the left and right front driven wheels, the vehicle can have left and right front driving wheels. Furthermore, this vehicle can have left and right rear braking mechanisms which are operable to brake the left and right rear driven wheels, respectively. The vehicle can have left and right front driving motors which are operable to mutually independently drive and brake the left and right front driving wheels, respectively. In this case, instead of the left and right driven rear wheels, the vehicle can also have one driven rear wheel which is located in a substantially central portion in the vehicle width direction.

The vehicle 100 also has a controller 107 used for controlling the vehicle 100. The controller 107 may include: electronic components such as a CPU (Central Processing Unit), a RAM (Random Access Memory), a ROM (Read Only Memory), a flash memory, an input interface, an output interface, and the like; and electric circuitry having these electronic components arranged therein. In addition, the ROM may have stored therein programs for causing the controller 107 including the ROM to function. Furthermore, the ROM may have stored therein a variety of constants used for a variety of computations and/or the like, a variety of maps, and/or the like.

The controller 107 is electrically connected to the operating device 1, the left and right driving motors 103 and 104, and the left and right braking mechanisms (not shown).

Instructions from the operating device 1 are transmitted to the controller 107 by electric signals, and furthermore, based on these instructions from the operating device 1, the controller 107 controls the left and right driving motors 103 and 104 and the left and right braking mechanisms.

This vehicle 100 has a moving base 108 on which the left and right driving wheels 101 and 102, and the left and right driven wheels 105 and 106 are rotatably attached. On this moving base 108, the left and right driving motors 103 and 104, the left and right braking mechanisms (not shown), and the controller 107 are installed.

The vehicle 100 also has one seat 109 which is placed above the moving base 108. The seat 109 has a seating part 109*a* which is configured so as to allow an occupant to be seated thereon. In particular, this seat 109 may be configured for a single seater. However, the seat of the vehicle is not limited to these.

The vehicle 100 has armrests 110 which are located closer to outsides of the vehicle in the width direction with respect to the seating part 109*a* of the seat 109 and above the seating part 109*a*. In particular, the vehicle 100 may have the two armrests 110. However, the vehicle can be configured so as to have at least one armrest.

These armrests 110 are also installed above the moving base 108. Each of the armrests 110 has a front end part 110*a* which is located close to the vehicle front, and a rear end part 110*b* which is located close to the vehicle rear. Each of the armrests 110 has a middle part 110*c* which is located between these front end part 110*a* and rear end part 110*b*. Each of the armrests 110 is configured so as to allow an elbow of the occupant seated on the seating part 109*a* of the seat 109, to be placed on the middle part 110*c* of each of the armrests 110.

Details of Joystick

The joystick 2 may be as follows in details. As shown in FIGS. 2 to 7, the grip 21 of the joystick 2 is formed in an elongated shape. The grip 21 extends along a reference axis line 2*a* of the joystick 2. The outer surface 21*a* of the grip 21 includes an outer peripheral surface 21*c* which is located around the reference axis line 2*a*.

As shown in FIG. 1, the joystick 2 is installed on one of the two armrests 110. As shown in FIGS. 2 to 7, the joystick 2 has a supporting body 22 which supports the grip 21 so as to allow the grip to be swingably moved in the vehicle width direction. The supporting body 22 is installed in the front end part 110*a* of the one of the armrests 110. The grip 21 is located so as to protrude in a central portion of a width direction of the vehicle 100 and in an oblique direction on an upper side of the vehicle. The grip 21 is swingably moved in the vehicle width direction with a swingable movement axis line 21*d* passing through the supporting body 22 as a center. In addition, swingable movements of the grip 21 in the vehicle front-rear direction and the vehicle upper-lower direction may be restrained.

The reference axis line 2*a* of the joystick 2 is located so as to be rotated upward of the vehicle with respect to a horizontal axis line H extending along the vehicle width direction, with the swingable movement axis line 21*d* as a center. A reference angle θ1 defined between the reference axis line 2*a* and the horizontal axis line H, may be an acute angle. For example, the reference angle θ1 can be approximately 30 degrees. However, the reference angle is not limited to this.

Figure 4:
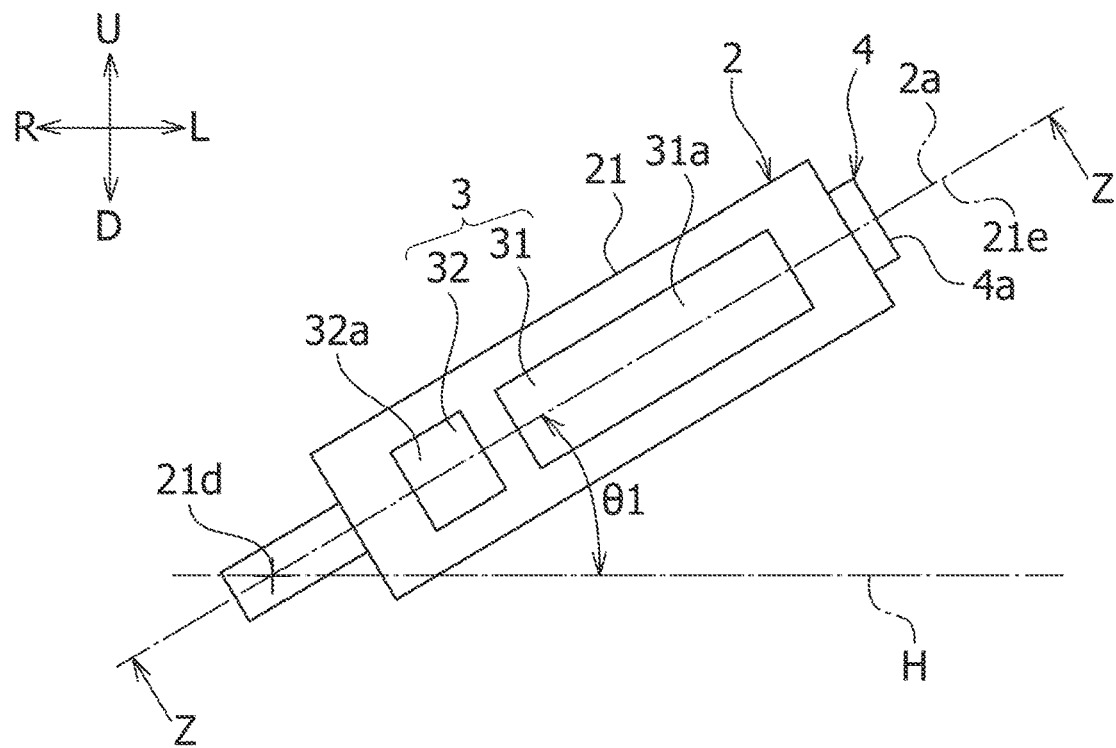
FIG. 4 is a front view schematically showing a grip of a joystick of the operating device according to the Embodiment, in a state in which the grip is set in a basic posture.
Figure 5:
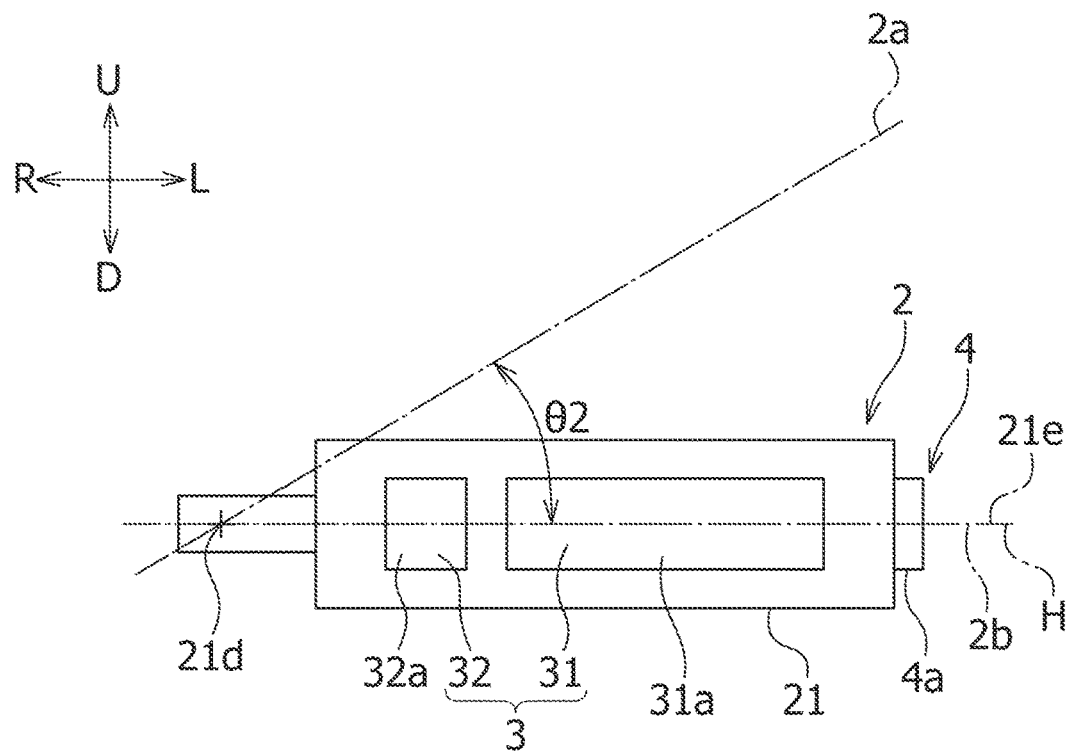
FIG. 5 is a front view schematically showing the grip of the joystick of the operating device according to the Embodiment in a state of a leftward lying-down posture.

As shown in FIGS. 2 to 4, the grip 21 in an initial state in which the grip 21 is not operated, is in a basic posture in which a grip axis line 21*e* substantially coincides with the reference axis line 2*a*. Furthermore, as shown in FIG. 5, the grip 21 can be swingably moved from the basic posture to a left swingable movement posture in which the grip axis line 21*a* substantially coincides with a left operation axis line 2b. Note that the left operation axis line 2b is located so as to be rotated to the vehicle left side with respect to the reference axis line 2a, with the swingable movement axis line 21d as a center. A left swingable movement angle θ2 defined between the left operation axis line 2b and the reference axis line 2a, may be an acute angle. For example, the left swingable movement angle θ2 can be approximately 30 degrees. However, the left swingable movement angle is not limited to this.

Figure 6:
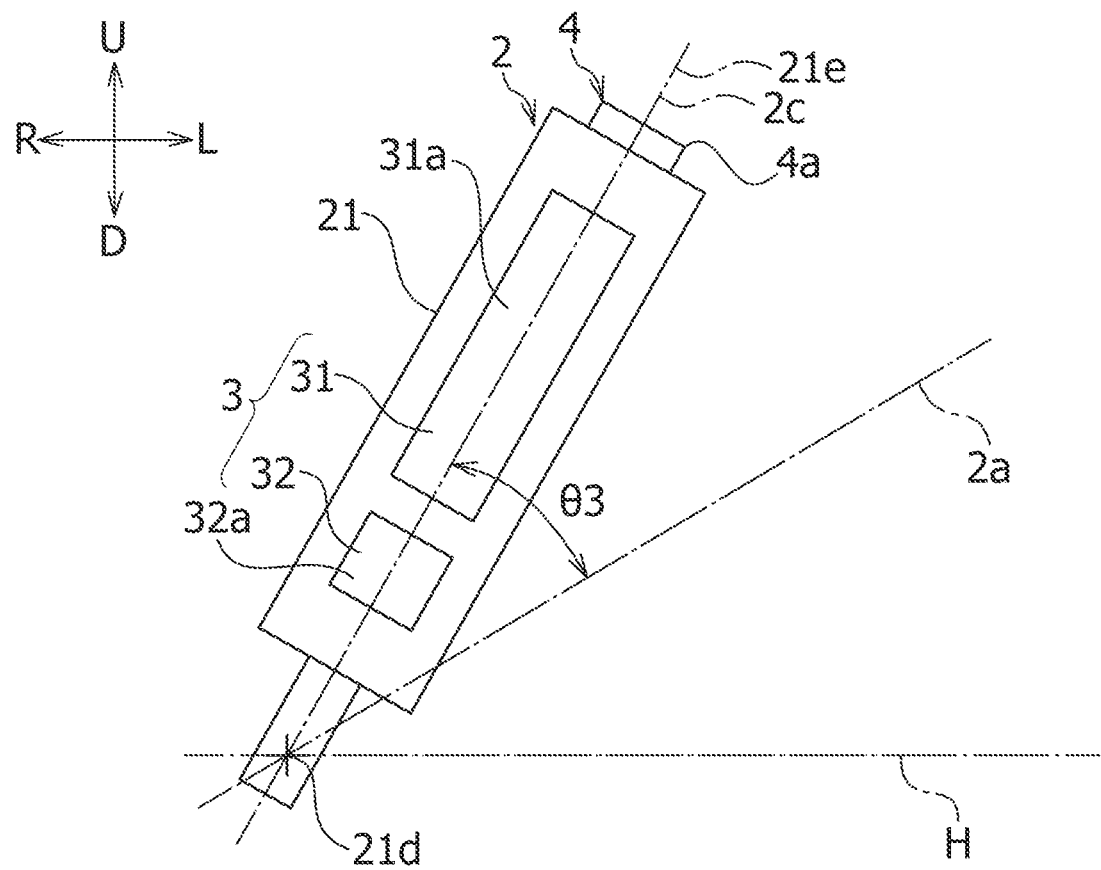
FIG. 6 is a front view schematically showing the grip of the joystick of the operating device according to the Embodiment in a state of a rightward lying-down posture.

As shown in FIG. 6, the grip 21 can also be swingably moved from the basic posture to a right swingable movement posture in which the grip axis line 21a substantially coincides with a right operation axis line 2c. Note that the right operation axis line 2c is located so as to be rotated to the vehicle right side with respect to the reference axis line 2a, with the swingable movement axis line 21d as a center. A right swingable movement angle θ3 defined between the right operation axis line 2c and the reference axis line 2a, may be an acute angle. For example, the right swingable movement angle θ3 can be approximately 30 degrees. However, the right swingable movement angle is not limited to this.

As shown in FIGS. 2 and 3, the grip 21 is biased so as to be resettable to the basic posture even when swingably moved from the basic posture to the vehicle left side or right side. The joystick 2 has a coil spring 23 as a biasing means for biasing the grip 21 as mentioned above. The coil spring 23 may be compressed between the grip 21 and the supporting body 22 in a state in which the coil spring 23 is inserted into a base end part 21f of the grip 21. However, the biasing means is not limited to the coil spring.

The joystick 2 has a swingable movement detector which can detect vehicle left side and right side swingable movements of the grip 21, although the swingable movement detector is not particularly shown. The swingable movement detector is installed inside the supporting body 22. The joystick 2 is electrically connected to the controller 107. In particular, the swingable movement detector is electrically connected to the controller 107. This swingable movement detector may be a contact-type switch, sensor, and/or the like. However, the swingable movement detector can also be a non-contact-type switch, sensor, and/or the like.

As shown in FIG. 7, the grip 21 has recessed parts 21g and 21h which are recessed from the outer surface 21a so as to correspond to the push switches 31 and 32 used in the traveling instruction portion 3. Specifically, the grip 21 has the first recessed part 21g and the second recessed part 21h recessed from the outer peripheral surface 21c so as to correspond to the advancing instruction part 31 and the backing up instruction part 32 which are the push switches 31 and 32, respectively. The grip 21 has a third recessed part 21i recessed from the outer surface 21a so as to correspond to the auxiliary instruction portion 4 which is the push switch 4. The first and second recessed parts 21g and 21h are opened toward the vehicle front. The third recessed part 21i is opened in a direction from the base end part 21f of the grip 21 toward the leading end part 21b thereof. Note that in FIG. 7, an internal structure other than the first to third recessed parts 21g to 21i is omitted.

With reference to FIGS. 4 to 6, when the grip 21 of the joystick 2 in the basic posture is swingably moved to the vehicle left side, a leftward rotation instruction to turn the vehicle 100 to the vehicle left side, is issued. In addition, when the grip 21 of the joystick 2 in the basic posture is swingably moved to the vehicle right side, a rightward rotation instruction to turn the vehicle 100 to the vehicle right side, is issued. Note that as the turning direction instruction, these leftward and rightward rotation instructions are included.

Details of Traveling Instruction Portion

The traveling instruction portion 3 may be as follows in detail. As shown in FIGS. 2 and 4 to 7, the entirety of the push switches 31 and 32 used in the traveling instruction portion 3, are housed in the recessed parts 21g and 21h of the grip 21. Specifically, the whole of the advancing and backing up instruction parts 31 and 32 which are the push switches 31 and 32, are housed in the first and second recessed parts 21g and 21h of the grip 21, respectively.

The push buttons 31a and 32a of the push switches 31 and 32 used in the traveling instruction portion 3, are located in a front part 21j of the grip 21, which is located close to the vehicle front. Specifically, the push buttons 31a and 32a of the advancing and backing up instruction parts 31 and 32 are located in the front part 21j of the grip 21, which is located close to the vehicle front. A direction in which the push buttons 31a and 32a are pushed down, may be from the vehicle front toward the vehicle rear.

The advancing and backing up instruction parts 31 and 32 are arranged in a longitudinal direction of the grip 21. The advancing instruction part 31 is located closer to the leading end part 21b of the grip 21 than the backing up instruction part 32. In the longitudinal direction of the grip 21, a length of the push button 31a of the advancing instruction part 31 is longer than a length of the push button 32a of the backing up instruction part 32.

As shown in FIG. 7, the push button 31a of the advancing instruction part 31 in an initial state in which the push button 31a is not operated, is located in a basic position in which the push button 31a is located closest to the outer surface 21a of the grip 21. When the push button 31a is pushed down from an initial position, the advancing instruction part 31 starts the advancing instruction of the vehicle 100. In particular, the advancing instruction part 31 may issue the advancing instruction of the vehicle 100 while the push button 31a is being pushed down from the initial position. The push button 31a is biased by a biasing means (not shown) so as to be resettable to a basic posture even when pushed down.

Furthermore, the advancing instruction part 31 increases the advancing speed V of the vehicle 100 in accordance with an increase in a pushing-down amount of the push button 31a. The advancing instruction part 31 may increase the advancing speed V of the vehicle 100 in a plurality of stages in accordance with increases in the pushing-down amount of the push button 31a in a plurality of stages. Note that a pushing-down amount of the push button 31a in the basic position is approximately 0 (zero) mm.

In FIG. 7, as an example, the advancing instruction part 31 increases the advancing speed V of the vehicle 100 in two stages in accordance with increases in the pushing-down amount of the push button 31a in two stages. Here, when the pushing-down amounts increased in a first stage and a second stage, are defined as a first pushing-down amount and a second pushing-down amount, respectively, the second pushing-down amount becomes greater than the first pushing-down amount. Note that in FIG. 7, the push button 31a pushed down in the first and second pushing-down amounts, is indicated by virtual lines. However, the advancing instruction part is not limited to this. For example, the advancing instruction part can also increase the advancing speed V of the vehicle in three or more stages in accordance with increases in the pushing-down amount of the push button in three or more stages.

The push button 32a of the backing up instruction part 32 in an initial state in which the push button 32a is not operated, is in a basic position in which the push button 32a is located closest to the outer surface 21a of the grip 21. When the push button 32a is pushed down from an initial position, the backing up instruction part 32 starts the backing up instruction of the vehicle 100. In particular, the backing up instruction part 32 may issue the backing up instruction of the vehicle 100 while the push button 32a is being pushed down from an initial position. The push button 32a is biased by a biasing means (not shown) so as to be resettable to a basic posture even when pushed down.

The traveling instruction portion 3 has a traveling instruction detector which is operable to detect operation thereof, although the traveling instruction detector is not particularly clearly shown. The traveling instruction portion 3 is electrically connected to the controller 107. Specifically, the traveling instruction detector is electrically connected to the controller 107. The traveling instruction detector is located inside the grip 21.

Specifically, the advancing instruction part 31 has an advancing instruction detector which is operable to detect operation thereof. The advancing instruction part 31 is electrically connected to the controller 107. In particular, the advancing instruction detector is electrically connected to the controller 107. The advancing instruction detector may be configured so as to be operable to detect a change in a pushing-down amount of the push button 31a. The advancing instruction detector is located inside the grip 21.

In addition, the backing up instruction part 32 has a backing up instruction detector which is operable to detect operation thereof. The backing up instruction part 32 is electrically connected to the controller 107. In particular, the backing up instruction detector is electrically connected to the controller 107. The backing up instruction detector is located inside the grip 21.

Details of Auxiliary Instruction Portion

The auxiliary instruction portion 4 may be as follows in details. As shown in FIGS. 2 and 4 to 7, a pushing-down direction of the push button 4a of the auxiliary instruction portion 4 is from the leading end part 21b of the grip 21 toward the base end part 21f. The push button 4a of the auxiliary instruction portion 4 in an initial state in which the push button 4a is not operated, is in a basic position in which the push button 4a is located closest to the leading end part 21b of the grip 21. The push button 4a in the basic position is housed in the third recessed part 21i of the grip 21 so as to protrude from the leading end part 21b of the grip 21.

The auxiliary instruction portion 4 starts the auxiliary instruction when the push button 4a is pushed down from an initial position. In particular, the auxiliary instruction portion 4 may issue the auxiliary instruction while the push button 4a is being pushed down from the initial position. The push button 4a is biased by a biasing means (not shown) so as to be resettable to a basic posture even when pushed down.

The auxiliary instruction portion 4 has an auxiliary instruction detector which is operable to detect operation thereof. The auxiliary instruction portion 4 is electrically connected to the controller 107. Specifically, the auxiliary instruction detector is electrically connected to the controller 107. The auxiliary instruction detector is located inside the grip 21.

Method of Operating Vehicle

An example of a method of operating the vehicle 100 in which the operating device 1 according to the Embodiment is used, will be described. Traveling of the vehicle 100 is performed based on traveling instructions made by operating the traveling instruction portion 3. The traveling instructions are instructions which drive the left and right driving motors 103 and 104 so as to rotate the left and right driving wheels 101 and 102 forward or backward.

Specifically, advancing of the vehicle 100 is performed based on the advancing instruction issued by operating the advancing instruction part 31, specifically, by pushing down the advancing instruction part 31 which is the push switch 31. The advancing instruction is an instruction which drives the left and right driving motors 103 and 104 so as to rotate the left and right driving wheels 101 and 102 forward. Backing up of the vehicle 100 is performed based on the backing up instruction issued by operating the backing up instruction part 32, specifically, by pushing down the push button 32a of the backing up instruction part 32 which is the push switch 32. The backing up instruction is an instruction which drives the left and right driving motors 103 and 104 so as to rotate the left and right driving wheels 101 and 102 backward.

Changing of the advancing speed V of the vehicle 100 is performed based on the advancing speed changing instruction of the vehicle 100, issued by changing the operating amount of the advancing instruction part 31. The advancing speed changing instruction is an instruction which changes the rotating speeds of the left and right driving motors 103 and 104 so as to change the rotating speeds of the left and right driving wheels 101 and 102 in a forward rotation direction.

In addition, increasing of the advancing speed V of the vehicle 100 is performed based on an advancing speed increasing instruction of the vehicle 100, issued by increasing the pushing-down amount of the push button 31a of the advancing instruction part 31 which is the push switch 31. The advancing speed increasing instruction is an instruction which increases the rotating speeds of the left and right driving motors 103 and 104 so as to change the rotating speeds of the left and right driving wheels 101 and 102 in the forward rotation direction. Furthermore, increasing of the advancing speed V of the vehicle 100 is performed based on a combination of the above advancing instruction and the auxiliary instruction issued by operating the auxiliary instruction portion 4, specifically, by pushing down the push button 4a of the auxiliary instruction portion 4 which is the push switch 4. The combination of the advancing instruction and the auxiliary instruction is also a combination of the instructions which increase the rotating speeds of the left and right driving motors 103 and 104 so as to change the rotating speeds of the left and right driving wheels 101 and 102 in the forward rotation direction.

For example, when as to the advancing speed changing instruction or the advancing speed increasing instruction, an advancing speed V of the vehicle 100 in a state in which the push button 31a of the advancing instruction part 31 is pushed down in the first pushing-down amount is defined as a first advancing speed V1 and an advancing speed V of the vehicle 100 in a state in which this push button 31a is pushed down in the second pushing-down amount is defined as a second advancing speed V2, the second advancing speed V2 is greater than the first advancing speed V1. In addition, when an advancing speed V of the vehicle 100 which is increased based on the combination of the advancing instruction and the auxiliary instruction, is defined as a third advancing speed V3, the third advancing speed V3 may be greater than a standard maximum advancing speed Vm of the vehicle 100 which is maximized based on the advancing speed changing instruction or the advancing speed increasing instruction. Note that the third advancing speed may be greater than the first or second advancing speed.

The first advancing speed V1 can be approximately 1 km/h, and the second advancing speed V2 can be approximately 3 km/h, and the third advancing speed V3 can be approximately 4.5 km/h, although these are merely examples. However, the first to third advancing speeds are not limited to these.

The gentle turn of the vehicle 100 is performed based on the combination of the turning direction instruction of the joystick 2 and the traveling instruction of the traveling instruction portion 3. Specifically, a left advancing side gentle turn of the vehicle 100 is performed based on a combination of the leftward rotation instruction of the joystick 2 and the advancing instruction of the advancing instruction part 31. The combination of the leftward rotation instruction and the advancing instruction is a combination of instructions which more increase a rotating speed of the right driving motor 104 than a rotating speed of the left driving motor 103 so as to make a rotating speed of the right driving wheel 102 in a forward direction greater than a rotating speed of the left driving wheel 101 in the forward direction.

A right advancing side gentle turn of the vehicle 100 is performed based on a combination of the rightward rotation instruction of the joystick 2 and the advancing instruction of the advancing instruction part 31. The combination of the rightward rotation instruction and the advancing instruction are a combination of instructions which more increase the rotating speed of the left driving motor 103 than the rotating speed of the right driving motor 104 so as to make the rotating speed of the left driving wheel 101 in the forward direction greater than the rotating speed of the right driving wheel 102 in the forward direction.

A left backing up side gentle turn of the vehicle 100 is performed based on a combination of the leftward rotation instruction of the joystick 2 and the backing up instruction of the backing up instruction part 32. The combination of the leftward rotation instruction and the backing up instruction are a combination of instructions which more increase the rotating speed of the right driving motor 104 than the rotating speed of the left driving motor 103 so as to make the rotating speed of the right driving wheel 102 in a backward direction greater than the rotating speed of the left driving wheel 101 in the backward direction.

A right backing up side gentle turn of the vehicle 100 is performed based on a combination of the rightward rotation instruction of the joystick 2 and the backing up instruction of the backing up instruction part 32. The combination of the rightward rotation instruction and the backing up instruction is a combination of instructions which more increase the rotating speed of the left driving motor 103 than the rotating speed of the right driving motor 104 so as to make the rotating speed of the left driving wheel 101 in the backward direction greater than the rotating speed of the right driving wheel 102 in the backward direction.

A pivotal brake turn of the vehicle 100 is also performed based on a combination of the turning direction instruction of the joystick 2 and the traveling instruction of the traveling instruction portion 3. Specifically, a left advancing side pivotal brake turn of the vehicle 100 is performed based on a combination of the leftward rotation instruction of the joystick 2 and the advancing instruction of the advancing instruction part 31. The combination of the leftward rotation instruction and the advancing instruction is a combination of instructions which rotate the right driving motor 104 and stop the left driving motor 103 so as to rotate the right driving wheel 102 in the forward direction and stop the left driving wheel 101.

A right advancing side pivotal brake turn of the vehicle 100 is performed based on a combination of the rightward rotation instruction of the joystick 2 and the advancing instruction of the advancing instruction part 31. The combination of the rightward rotation instruction and the advancing instruction is a combination of instructions which rotate the left driving motor 103 and stop the right driving motor 104 so as to rotate the left driving wheel 101 in the forward direction and stop the right driving wheel 102.

A left backing up side pivotal brake turn of the vehicle 100 is performed based on a combination of the leftward rotation instruction of the joystick 2 and the backing up instruction of the backing up instruction part 32. The combination of the leftward rotation instruction and the backing up instruction is a combination of instructions which rotate the right driving motor 104 and stop the left driving motor 103 so as to rotate the right driving wheel 102 in the backward direction and stop the left driving wheel 101.

A right backing up side pivotal brake turn of the vehicle 100 is performed based on a combination of the rightward rotation instruction of the joystick 2 and the backing up instruction of the backing up instruction part 32. The combination of the rightward rotation instruction and the backing up instruction is a combination of instructions which rotate the left driving motor 103 and stop the right driving motor 104 so as to rotate the left driving wheel 101 in the backward direction and stop the right driving wheel 102.

A spin turn of the vehicle 100 is performed based on a combination of the turning direction instruction of the joystick 2 and the auxiliary instruction of the auxiliary instruction portion 4. The above combination of the turning direction instruction and the auxiliary instruction is a combination of instructions which rotate the left and right driving motors 103 and 104 reversely to each other so as to rotate the left and right driving wheels 101 and 102 reversely to each other.

Specifically, a left spin turn of the vehicle 100 is performed based on a combination of the leftward rotation instruction of the joystick 2 and the auxiliary instruction of the auxiliary instruction portion 4. The combination of the rightward rotation instruction and the auxiliary instruction is a combination of instructions which rotate the left and right driving motors 103 and 104 reversely to each other so as to rotate the left driving wheel 101 in the backward direction and rotate the right driving wheel 102 in the forward direction.

Specifically, a right spin turn of the vehicle 100 is performed based on a combination of the rightward rotation instruction of the joystick 2 and the auxiliary instruction of the auxiliary instruction portion 4. The combination of the rightward rotation instruction and the auxiliary instruction is a combination of instructions which rotate the left and right driving motors 103 and 104 reversely to each other so as to rotate the left driving wheel 101 in the forward direction and rotate the right driving wheel 102 in the backward direction.

As described above, the operating device 1 according to the Embodiment is configured so as to be capable of operating the electric vehicle 100 which has the left and right driving wheels 101 and 102 and the left and right driving motors 103 and 104 respectively independently driving these left and right driving wheels 101 and 102. This operating device 1 has the joystick 2 which is operable to move so as to issue the turning direction instruction of the vehicle 100 and the traveling instruction portion 3 which issues the traveling instruction of the vehicle 100 by the operation different from the movement operation of this joystick 2. The joystick 2 has the grip 21 which can be gripped by an occupant on the vehicle 100. By making the difference between the rotating speeds of the left and right driving motors 103 and 104 based on the combination of the turning direction instruction of the joystick 2 and the traveling instruction of the traveling instruction portion 3, the gentle turn or the pivotal brake turn of the vehicle 100 is performed.

Typically, whereas the joystick 2 allows easy steering of the vehicle 100, there is a high chance that the joystick 2 is erroneously contacted by the occupant. In contrast to this, in the operating device 1 according to the Embodiment, the turning direction instruction of the vehicle 100 is issued by the movement operation of the joystick 2, and the traveling instruction of the vehicle 100 is issued by the operation of the traveling instruction portion 3, which is different from the movement operation of the joystick 2. Therefore, even if the occupant erroneously contacts the joystick 2, advancing or backing up of the vehicle 100 against the intention of the occupant can be prevented. In addition, since the movement operation of the joystick 2 which issues the turning direction instruction and the operation of the traveling instruction portion 3 which issues the traveling instruction can be clearly separated, confusion between the operation for issuing the turning direction instruction and the operation for issuing the traveling instruction, made by the occupant, can be prevented. On the other hand, since by combining the turning direction instruction of the joystick 2 and the traveling instruction of the traveling instruction portion 3, the difference between the rotating speeds of the left and right driving motors 103 and 104 is easily brought about, and the gentle turn or the pivotal brake turn of the vehicle 100 can be easily performed by this difference, the vehicle 100 is easily operated. Thus, the erroneous operation of the vehicle 100 by the occupant can be prevented, and operability of the vehicle 100 can be enhanced.

In the operating device 1 according to the Embodiment, the traveling instruction portion 3 is configured by using the push switches 31 and 32 having the push buttons 31*a* and 32*a* and is installed in the grip 21 of the joystick 2. In addition, the push buttons 31*a* and 32*a* are located close to the interior of the grip 21 with respect to the outer surface 21*a* of the grip 21.

Therefore, even if the occupant erroneously contacts the grip 21 of the joystick 2, the occupant hardly contacts the push buttons 31*a* and 32*a* of the push switches 31 and 32. In addition, since while the confusion between the movement operation of the joystick 2 for issuing the turning direction instruction, and the operation of the push buttons 31*a* and 32*a* for issuing the traveling instruction, made by the occupant, is prevented, the movement operation of the joystick 2 and the operation of the push buttons 31*a* and 32*a* can be easily performed by one hand of the occupant, which grips the grip 21 of the joystick 2, the operability of the vehicle 100 can be enhanced while the erroneous operation by the occupant can be prevented.

In the operating device 1 according to the Embodiment, the traveling instruction portion 3 has the advancing instruction part 31 which issues the advancing instruction of the vehicle 100. In addition, the traveling instruction portion 3 further has the backing up instruction part 32 for issuing the backing up instruction of the vehicle 100. Therefore, since the operation of the advancing instruction part 31 which issues the advancing instruction, and the operation of the backing up instruction part 32 which issues the backing up instruction, can be clearly separated, the confusion between the operation for issuing the advancing instruction and the operation for issuing the backing up instruction, made by the occupant, can be prevented.

In the operating device 1 according to the Embodiment, the advancing instruction part 31 is configured so as to issue the advancing speed changing instruction of the vehicle 100 by changing the operating amount of the advancing instruction part 31. By changing the rotating speeds of the left and right driving motors 103 and 104 based on the advancing speed changing instruction of the advancing instruction part 31, the advancing speed V of the vehicle 100 is changed. Therefore, since the advancing instruction of the vehicle 100 and the advancing speed changing instruction of the vehicle 100 relating to the advancement can be issued by the advancing instruction part 31, the vehicle 100 can be easily operated.

The operating device 1 according to the Embodiment has the auxiliary instruction portion 4 which is configured so as to issue the auxiliary instruction of the vehicle 100. When this auxiliary instruction is combined with the instruction other than the auxiliary instruction, the option operation of the electric vehicle 100 is performed. The auxiliary instruction portion 4 is installed in the joystick 2. Therefore, since by combining the auxiliary instruction of the auxiliary instruction portion 4 and the instruction other than the auxiliary instruction, the option operation of the vehicle 100 is easily performed, the operability of the vehicle 100 can be enhanced. In addition, since when the auxiliary instruction of the auxiliary instruction portion 4 is not combined with the instruction other than the auxiliary instruction, the option operation of the vehicle 100 can be made not to be performed, even when the occupant erroneously performs the operation for issuing the instruction other than the auxiliary instruction, the option operation of the vehicle 100 can be prevented from being erroneously performed.

In the operating device 1 according to the Embodiment, as the instruction other than the auxiliary instruction, the advancing instruction of the advancing instruction part 31 is included. As the option operation of the vehicle 100, increasing the advancing speed of the vehicle 100 is included. By increasing the rotating speeds of the left and right driving motors 103 and 104 based on the combination of the advancing instruction of the advancing instruction part 31 and the auxiliary instruction of the auxiliary instruction portion 4, the advancing speed of the vehicle 100 is increased. Therefore, since by combining the advancing instruction of the advancing instruction part 31 with the auxiliary instruction of the auxiliary instruction portion 4, the advancing speed V of the vehicle 100 is easily increased, the operability of the vehicle 100 can be enhanced. In addition, when the advancing instruction of the advancing instruction part 31 is not combined with the auxiliary instruction of the auxiliary instruction portion 4, since anomalous increasing of the advancing speed V of the vehicle 100 can be avoided, if the occupant erroneously operates the advancing instruction part 31, erroneously increasing the advancing speed V of the vehicle 100 in an anomalistic manner can be prevented.

In the operating device 1 according to the Embodiment, as the instruction other than the auxiliary instruction, the turning direction instruction of the joystick 2 is included. As the option operation of the vehicle 100, the spin turn of the vehicle 100 is included. By mutually reversing the rotations of the left and right driving motors 103 and 104 based on the combination of the turning direction instruction of the joystick 2 and the auxiliary instruction of the auxiliary instruction portion 4, the spin turn of the vehicle 100 is performed. Therefore, since by combining the turning direction instruction of the joystick 2 and the traveling instruction of the traveling instruction portion 3, the spin turn of the vehicle 100 can be easily performed, the operability of the vehicle 100 can be enhanced. In addition, since when the turning direction instruction of the joystick 2 is not combined with the auxiliary instruction of the auxiliary instruction portion 4, anomalous performing of the spin turn of the vehicle 100 can be avoided, if the occupant erroneously operates the joystick 2, erroneously performing the spin turn of the vehicle 100 in an anomalous manner can be prevented.

In the operating device 1 according to the Embodiment, the auxiliary instruction portion 4 is the push switch 4 having the push button 4a and is installed in the leading end part 21b of the grip 21 of the joystick 2. Since this leading end part 21b of the grip 21 is hardly erroneously touched by the occupant upon performing the movement operation of the joystick 2, erroneously touching the auxiliary instruction portion 4 of the leading end part 21b of the grip 21 by occupant can be prevented. As a result, erroneously performing the option operation of the vehicle 100 can be prevented. On the other hand, since the auxiliary instruction portion 4 installed in the leading end part 21b of the grip 21 is the push switch 4, operability of the auxiliary instruction portion 4 is ensured.

Hereinbefore, the Embodiment of the present invention is described. However, the present invention is not limited to the above-described Embodiment, and a variety of variations and modifications of the present invention can be made based on the technical idea of the present invention.

What is claimed is:

1. An operating device of an electric vehicle, the operating device being configured so as to enable the electric vehicle to be operated, the electric vehicle having: left and right driving wheels being located respectively on a left side and a right side of the electric vehicle facing in an advancing direction; and left and right driving motors respectively independently driving the left and right driving wheels, the operating device comprising:
   a joystick being configured to be operable to move so as to issue a turning direction instruction of the electric vehicle; and
   a traveling instruction portion being configured so as to issue a traveling instruction of the electric vehicle by operation being different from movement operation of the joystick, wherein
   the joystick has a grip being configured so as to be operable and gripped by an occupant on the electric vehicle, and
   by making a difference between rotating speeds of the left and right driving motors based on a combination of the turning direction instruction of the joystick and the traveling instruction of the traveling instruction portion, a gentle turn of the electric vehicle or a pivotal brake turn of the electric vehicle is performed, wherein
   the traveling instruction portion is configured by using a push switch having a push button, and is installed in the grip of the joystick, and
   the push button is located close to an interior of the grip with respect to an outer surface of the grip.

2. An operating device of an electric vehicle, the operating device being configured so as to enable the electric vehicle to be operated, the electric vehicle having: left and right driving wheels being located respectively on a left side and a right side of the electric vehicle facing in an advancing direction; and left and right driving motors respectively independently driving the left and right driving wheels, the operating device comprising:
   a joystick being configured to be operable to move so as to issue a turning direction instruction of the electric vehicle; and
   a traveling instruction portion being configured so as to issue a traveling instruction of the electric vehicle by operation being different from movement operation of the joystick, wherein
   the joystick has a grip being configured so as to be operable and gripped by an occupant on the electric vehicle, and
   by making a difference between rotating speeds of the left and right driving motors based on a combination of the turning direction instruction of the joystick and the traveling instruction of the traveling instruction portion, a gentle turn of the electric vehicle or a pivotal brake turn of the electric vehicle is performed, wherein
   the traveling instruction portion has an advancing instruction part which issues an advancing instruction of the electric vehicle.

3. The operating device of the electric vehicle according to claim 2, wherein
   the traveling instruction portion further has a backing up instruction part which issues a backing up instruction of the electric vehicle.

4. The operating device of the electric vehicle according to claim 2, wherein
   the advancing instruction part is configured so as to issue an advancing speed changing instruction of the electric vehicle by changing an operating amount of the advancing instruction part, and
   by changing the rotating speeds of the left and right driving motors based on the advancing speed changing instruction of the advancing instruction part, an advancing speed of the electric vehicle is changed.

5. An operating device of an electric vehicle, the operating device being configured so as to enable the electric vehicle to be operated, the electric vehicle having: left and right driving wheels being located respectively on a left side and a right side of the electric vehicle facing in an advancing direction; and left and right driving motors respectively independently driving the left and right driving wheels, the operating device comprising:
   a joystick being configured to be operable to move so as to issue a turning direction instruction of the electric vehicle; and
   a traveling instruction portion being configured so as to issue a traveling instruction of the electric vehicle by operation being different from movement operation of the joystick, wherein
   the joystick has a grip being configured so as to be operable and gripped by an occupant on the electric vehicle, and
   by making a difference between rotating speeds of the left and right driving motors based on a combination of the turning direction instruction of the joystick and the traveling instruction of the traveling instruction portion, a gentle turn of the electric vehicle or a pivotal brake turn of the electric vehicle is performed, the operating device comprising an auxiliary instruction portion being configured so as to issue an auxiliary instruction of the electric vehicle, wherein when the auxiliary instruction is combined with an instruction other than the auxiliary instruction, an option operation of the electric vehicle is performed, and the auxiliary instruction portion is installed in the joystick.

6. The operating device of the electric vehicle according to claim 5, wherein the traveling instruction portion has an advancing instruction part of the electric vehicle, the advancing instruction part issuing an advancing instruction, as the instruction other than the auxiliary instruction, the advancing instruction of the advancing instruction part is included, as the option operation of the electric vehicle, increasing an advancing speed of the electric vehicle is included, and by increasing the rotating speeds of the left and right driving motors based on a combination of the advancing instruction of the advancing instruction part and the auxiliary instruction of the auxiliary instruction portion, the advancing speed of the electric vehicle is increased.

7. The operating device of the electric vehicle according to claim 6, wherein as the instruction other than the auxiliary instruction, the turning direction instruction of the joystick is included, as the option operation of the electric vehicle, a spin turn of the electric vehicle is included, and by mutually reversing rotations of the left and right driving motors based on a combination of the turning direction instruction of the joystick and the auxiliary instruction of the auxiliary instruction portion, the spin turn of the electric vehicle is performed.

8. The operating device of the electric vehicle according to claim 5, wherein the auxiliary instruction portion is a push switch having a push button and is installed in a leading end part of the grip of the joystick.

* * * * *